Patented Sept. 30, 1941

2,257,694

UNITED STATES PATENT OFFICE 2,257,694

PROCESS FOR DYEING LEATHER

Adolf Krebser, Riehen, near Basel, Switzerland, assignor to J. R. Geigy A. G., Basel, Switzerland No Drawing. Application April 2, 1940, Serial No. 327,520. In Switzerland April 27, 1939

12 Claims. (Cl. 8—13)

It has been found that leather can be dyed full and deep shades, by using diazo dyestuffs of the general formula

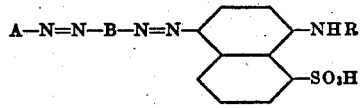

wherein A means the radical of a diphenylamine sulphonic acid, B means a naphthalene radical, containing the two azo groups in p-position, and R means an alkyl or aryl group of the benzene series, the number of sulphonic acid groups contained in the dyestuff molecule being at least 3. For the manufacture of the disazo dyestuffs constructed according to the above scheme, p-aminodiphenylamine sulphonic acids, such as for instance 4-aminodiphenylamine-2-sulphonic acid, 4'-nitro-4-aminodiphenylamine-2'-sulphonic acid, 2'-nitro-4-aminodiphenylamine-4'-sulphonic acid, 4'-methyl-4-aminodiphenylamine-2-sulphonic acid and so on are diazotized according to known methods and then coupled in an acid medium with α-naphthylamine, 1-aminonaphthalene-6- or 7-sulphonic acid or their mixture, whereupon the so obtained monoazo dyestuffs are further diazotized and coupled in acid solution or suspension with N-aryl- or N-alkyl-1-aminonaphthalene-8-sulphonic acids, such as for example 1-phenylaminonaphthalene-8-sulphonic acid, 1-p-tolylaminonaphthalene-8-sulphonic acid, 1-methylaminonaphthalene-8-sulphonic acid, etc.

The dyestuffs are especially suitable for the dyeing of velour-leather, thus giving full and deep blue to black colors having an excellent fastness to polishing.

Disazo dyestuffs of a similar structure with α-naphthylamine as middle-component and naphthols or naphthol sulphonic acids as end-components have already been used for dyeing wool (see Schultz, Farbstofftabellen, 7th edition, 1st tome, No. 590), as well as similar products with amines of the benzene or naphthalene series as initial components, α-naphthylamine or Cleve acids as middle-components and 1-alkyl- or 1-arylaminonaphthalene-8-sulphonic acids as end-components (Schultz, l. c. No. 552 and 594). But the dyeings thereof do not show the full and deep blue or black shades or chrome-velour-leather and do not possess the good fastness to polishing as the dyestuffs of the present invention.

EXAMPLE FOR THE DYEING PROCESS

The chrome-tanned skins having been polished and softened as usual, are introduced with 300% of water of 60° C. into the dyeing drum and 10% of the dyestuff 4'-nitro-4-aminodiphenylamine-2'-sulphonic acid-azo→1-aminonaphthalene-6- and 7-sulphonic acid-mixture-azo→1-phenylaminonaphthalene-8-sulphonic acid, hot dissolved in the twentyfold quantity of water, are added through the hollow axis of the drum. After 30 minutes 5% of formic acid of 80% strength are added, then the drum is allowed to still move for an hour and the whole is worked as usual. It results a flowery full black of good fastness to polishing.

EXAMPLE FOR THE MANUFACTURE OF THE DYESTUFFS 30.8 parts of 4'-nitro-4-aminodiphenylamine-2'-sulphonic acid are diazotized according to the known method and coupled with 22.3 parts of the technical mixture of 1-aminonaphthalene-6- and -7-sulphonic acid. The obtained monoazo dyestuff is dissolved in water with 4 parts of caustic soda lye of 100% strength, then 7 parts of sodium nitrite are added and the mixture is caused to flow at 0° C. under cooling into 35 parts of hydrochloric acid of 30% strength. The diazotation being finished, the diazonium compound is combined in the cold and in the presence of sodium acetate with 21.9 parts of 1-phenylaminonaphthalene-8-sulphonic acid. The coupling is completed within a short time. The formed dyestuff is precipitated with common salt, filtered and dried. It constitutes a black powder which dissolves in water with violet-black and in concentrated sulphuric acid with green-blue coloration.

The following table gives a series of dyestuffs, which are used according to the present process, and the shades obtained with these dyestuffs.

Table

| | 1st component | 2d component | 3d component | Shade on velour-leather |
|---|---|---|---|---|
| 1 | 4'-nitro-4-aminodiphenylamine-2'-sulphonic acid. | Mixture of 1-aminonaphthalene-6- and -7-sulphonic acid. | 1-phenylamino-naphthalene-8-sulphonic acid. | Flowery black. |
| 2 | 2'-nitro-4-aminodiphenylamine-4'-sulphonic acid. | ......do...... | ......do...... | Full reddish-black. |
| 3 | 4'-methyl-4-aminodiphenylamine-2-sulphonic acid. | ......do...... | ......do...... | Flowery blue-black. |
| 4 | 4-aminodiphenylamine-2-sulphonic acid. | ......do...... | ......do...... | Deep blue. |
| 5 | 4'-nitro-4-aminodiphenylamine-2':3-disulphonic acid. | α-naphthylamine. | ......do...... | Full black. |
| 6 | 4'-nitro-4-aminodiphenylamine-2'-sulphonic acid. | 1-aminonaphthalene-6-sulphonic acid. | 1-p-tolyl-aminonaphthalene-8-sulphonic acid. | Flowery black. |

What I claim is:

1. A method of imparting full and deep blue to black shades to leather, which comprises dyeing the leather with a disazo dyestuff of the general formula

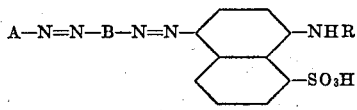

wherein A means the radical of a diphenylamine sulphonic acid, B means a naphthalene radical containing the two azo groups in p-position, and R means one member of the group consisting of alkyl- and aryl-groups of the benzene series, the number of sulphonic acid groups contained in the dyestuff molecule being at least 3.

2. A method of imparting full and deep blue to black shades to leather, which comprises dyeing the leather with the disazo dyestuff 4-aminodiphenylamine-2-sulphonic acid—azo→mixture of 1-aminonaphthalene-6- and -7-sulphonic acid—azo→1-phenylaminonaphthalene-8-sulphonic acid.

3. A method of imparting full and deep blue to black shades to leather, which comprises dyeing the leather with the disazo dyestuff 4'-nitro-4-aminodiphenylamine-2'-sulphonic acid—azo→1-aminonaphthalene-6-sulphonic acid—azo→1-p-tolyl aminonaphthalene-8-sulphonic acid.

4. A method of imparting full and deep blue to black shades to leather, which comprises dyeing the leather with the disazo dyestuff 4'-nitro-4-aminodiphenylamine-2'-sulphonic acid—azo→mixture of 1-aminonaphthalene-6- and -7-sulphonic acid—azo→1-phenylaminonaphthalene-8-sulphonic acid.

5. The disazo dyestuffs for dyeing leather having the following general formula

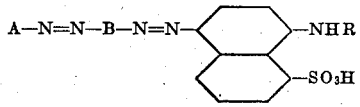

wherein A means the radical of a diphenylamine sulphonic acid, B means a naphthalene radical containing the two azo groups in p-position, and R means one member of the group consisting of alkyl- and aryl-groups of the benzene series, the number of sulphonic acid groups contained in the dyestuffs molecule being at least 3, said dyestuffs giving on velour-leather full and deep blue to black shades of good fastness to polishing.

6. The disazo dyestuff 4-aminodiphenylamine-2-sulphonic acid—azo→mixture of 1-aminonaphthalene-6- and -7-sulphonic acid—azo→1-phenylaminonaphthalene-8-sulphonic acid, giving a full blue on velour-leather.

7. The disazo dyestuff 4'-nitro-4-aminodiphenylamine-2'-sulphonic acid—azo→1-aminonaphthalene-6-sulphonic acid—azo→1-p-tolylaminonaphthalene-8-sulphonic acid, giving a flowery black on velour-leather.

8. The disazo dyestuff 4'-nitro-4-aminodiphenylamine-2'-sulphonic acid—azo→mixture of 1-aminonaphthalene-6- and -7-sulphonic acid—azo → 1 - phenylaminonaphthalene - 8 - sulphonic acid, giving a flowery black on velour-leather.

9. A process for the manufacture of disazo dyestuffs for dyeing leather, comprising the steps of diazotizing an aminodiphenylamine-sulphonic acid, coupling the obtained diazo compound with an amine of the naphthalene series coupling in p-position, diazotizing the resulting monoazo dyestuff and coupling the obtained diazonium compound with a 1-aminonaphthalene-8-sulphonic acid substituted in the amino group by a radical selected from the group consisting of alkyl and aryl radicals of the benzene series.

10. A process for the manufacture of disazo dyestuffs for dyeing leather, comprising the steps of diazotizing 4-amino-diphenylamine-2-sulphonic acid and coupling with a mixture of 1-aminonaphthalene-6- and -7-sulphonic acid, then diazotizing the resulting monoazo dyestuff and coupling the diazonium compound with 1 - phenylaminonaphthalene - 8 - sulphonic acid, thus realizing a dyestuff giving on velour-leather a flowery black shade.

11. A process for the manufacture of disazo dyestuffs for dyeing leather, comprising the steps of diazotizing 4'-nitro-4-aminodiphenylamine-2'-sulphonic acid and coupling with 1-aminonaphthalene-6-sulphonic acid, then diazotizing the resulting monoazo dyestuff and coupling the diazonium compound with 1-p-tolylaminonaphthalene-8-sulphonic acid, thus realizing a dyestuff yielding a flowery black shade on velour-leather.

12. A process for the manufacture of disazo dyestuffs for dyeing leather, comprising the steps of diazotizing 4'-nitro-4-aminodiphenylamine-2'-sulphonic acid and coupling with a mixture of 1-aminonaphthalene-6- and -7-sulphonic acid, then diazotizing the resulting monoazo dyestuff and coupling the diazonium compound with 1 - phenylaminonaphthalene - 8 - sulphonic acid, thus realizing a dyestuff giving a flowery black on velour-leather.

ADOLF KREBSER.